| United States Patent [19] | [11] Patent Number: 4,837,263 |
| Gastinger et al. | [45] Date of Patent: Jun. 6, 1989 |

[54] POLYMER POLYOL AND FLAME RETARDANT POLYURETHANE FOAMS

[75] Inventors: Robert G. Gastinger, West Chester, Pa.; John E. Hayes, Wilmington, Del.

[73] Assignee: Arco Chemical Technology, Inc., Wilmington, Del.

[21] Appl. No.: 59,293

[22] Filed: Jun. 8, 1987

[51] Int. Cl.$^4$ .................. C08K 5/06; C08L 71/02; C08F 22/40
[52] U.S. Cl. .................. 524/377; 525/187; 526/262; 528/75; 528/77; 528/76
[58] Field of Search .................. 528/322; 524/377; 525/187; 526/262

[56] References Cited

U.S. PATENT DOCUMENTS

| 3,770,697 | 11/1973 | Holub et al. | 528/322 |
| 4,351,932 | 9/1982 | Street et al. | 528/322 |
| 4,388,451 | 6/1983 | Culbertson et al. | 528/322 |
| 4,594,366 | 6/1986 | Taylor et al. | 521/137 |

*Primary Examiner*—John Kight
*Assistant Examiner*—Dennis R. Daley
*Attorney, Agent, or Firm*—Dennis M. Kozak

[57] ABSTRACT

Polymer dispersion polyols made by the free radical polymerization of a monomer mixture of at least a maleimide monomer and a copolymerizable styrenic monomer in an organic polyol medium are disclosed. The resulting polymer polyols are suitable for use to prepare flame retardant polyurethanes.

10 Claims, No Drawings

POLYMER POLYOL AND FLAME RETARDANT POLYURETHANE FOAMS

This invention relates to polyurethane polymers.

More specifically, this invention relates to polymer dispersions in polyols used in the preparation of flame retardant polyurethane foams.

In one of its more specific aspects, this invention pertains to stable, fluid polymer polyols made by the free radical polymerization of a monomer mixture of a maleimide monomer and a copolymerizable styrenic monomer in an organic polyol medium.

Graft copolymer dispersions prepared from vinyl monomers and polyether polyols and their use in the preparation of polyurethane polymers are well known. The pioneer patents in the field of polymer polyols are U.S. Pat. Nos. 3,304,273; 3,383,351; Re. 28,715; Re. 29,118; and 3,523,093 to Stamberger, and U.S. Pat. No. 3,652,639 to Pizzini, et al. In the patents to Stamberger, the method involves the in situ polymerization of a nitrile monomer (e.g., acrylonitrile and methacrylonitrile) in high molecular weight polyols. Pizzini, et al.'s method involves incorporating unsaturation into a polyol to increase the resultant level of grafting onto the polyol. The unsaturated polyol is typically prepared by the reaction of a saturated primary polyol with maleic anhydride followed by capping with ethylene oxide to reduce acidity.

Polymer polyols that found initial commercial acceptance were primarily produced from polyols and acrylonitrile. More recently, polymer polyols produced from polyols, acrylonitrile, and styrene have been the commerical standards. U.S. Pat. No. 4,198,488 to Drake, et al. teaches a further improvement to the method of Stamberger and involves the addition of a small amount (preferably 2.5 to 6 weight percent) of maleic anhydride to an acrylonitrile/styrene monomer feed. Drake, et al. teaches that a portion of the maleic anhydride units polymerize into the polymer backbone and react with the hydroxyl groups of the polyol.

The present invention provides a stable polymer polyol dispersion from a maleimide monomer. The polymer polyol of the invention can be prepared in the absence of a nitrile monomer and without using modified (unsaturated) polyols. The advantage of a process which facilitates the production of a polymer polyol in the absence of acrylonitrile is obvious due to acrylonitrile's high toxicity and its tendency to produce discolored dispersions resulting in scorched foams. Quite surprising were the discoveries that the use of the maleimide monomer resulted in a high level of grafting and that the maleimide monomer produced polyurethane foams having superior flame retardancy.

According to this invention, there is provided a polymer polyol suitable for reaction with an isocyanate to form a polyurethane comprising the reaction product prepared at a temperature within the range of from about 70° C. to about 150° C. under free radical conditions from a minor amount of a monomer mixture and a major amount of an organic polyol medium wherein:

(a) the monomer mixture comprises at least a first and a second monomer, wherein said first monomer is a maleimide monomer, and said second monomer is a styrenic monomer which is polymerizable with said first monomer;

(b) the organic polyol medium consists essentially of polyoxyalkylene polyether polyol.

Also according to this invention, there is provided a polyurethane composition comprising the reaction product of:

(a) a polymer polyol comprising the reaction product prepared at a temperature within the range of from about 70° C. to about 150° C. under free radical conditions from a minor amount of a monomer mixture and a major amount of an organic polyol medium, wherein (i) the monomer mixture comprises at least a first and a second monomer, wherein the first monomer is a maleimide monomer and is employed in the monomer mixture in an amount sufficient to improve the flame retardancy of the polyurethane composition as compared to the flame retardancy of the polyurethane composition in the absence of said maleimide monomer, and the second monomer is a styrenic monomer which is copolymerizable with the maleimide monomer, (ii) the organic polyol medium consists essentially of polyoxyalkylene polyether polyol; and (b) a polyisocyanate.

In one embodiment of this invention, the essential components of the polymer polyol are a maleimide monomer, a styrenic monomer polymerizable with the maleimide monomer, and a polyol; the monomer mixture containing in mole percent from about 25 to about 50 of total maleimide monomers and from about 75 to about 50 of total styrenic monomers.

The polyols suitable for use are one or more polyoxyalkylene polyether polyols which are the polymerization products of an alkene oxide or a mixture of alkene oxides with a polyhydric alcohol. The polyol may contain small amounts of unsaturation or may be modified to contain small amounts of unsaturation. The molecular weight of the polyol will be within the range of from about 100 to about 11,000, preferably from about 2,000 to about 6,500.

The monomer mixture according to the invention will contain at least one maleimide monomer selected from the group consisting of maleimide, N-arylmaleimides, and N-alkylmaleimides. Suitable maleimide monomers include maleimide, N-phenylmaleimide, N-methyl maleimide, N-ethyl maleimide, N-tolylmaleimide, N-(2,4,6-tribromophenyl)maleimide, 2-chlorophenylmaleimide, 4-chlorophenylmaleimide, and the like and their mixtures. N-phenylmaleimide is preferred.

The monomer mixture will also contain at least one styrenic monomer which is polymerizable with the maleimide monomer. Any suitable styrenic monomer or mixture of styrenic monomers can be employed. Suitable styrenic monomers include styrene, substituted styrenes such as α-methylstyrene, p-methylstyrene, chloromethylstyrene, vinyl toluene, and the like, and their mixtures. Styrene is the preferred styrenic monomer.

Although the monomer mixture employed to produce the polymer polyols of the invention is preferably a mixture of maleimide monomers and styrenic monomers, the mixture can comprise other monomers in addition to the maleimide and the styrenic monomers, provided the other monomer is copolymerizable with the maleimide and the styrenic monomers. Other monomers which can be incorporated during the polymerization reaction include acrylates, methacrylates, acrylamides, and their derivatives, α, β-ethylenically unsaturated dicarboxylic acid anhydrides, vinyl and vinylidene halides, and nitrile derivatives such as acrylonitrile and methacrylonitrile. If one or more other monomers are present during the polymerization reaction, it is possible to reduce the minimum amounts of maleimide and styrenic monomers such that the monomer mixture contains in mole percent from about 3 to about 50 total maleimide monomers, from about 20 to about 75 total styrenic monomers, and up to 65 total other monomers. Preferably, the other monomers, if employed, will be present in a total amount of from about 5 to about 65 mole percent.

The polymer polyol of the present invention can be produced by polymerizing the monomer mixture in the selected polyol at a temperature of from about 70° C. to about 150° C. in the presence of a catalytically effective amount of a conventional free radical catalyst known to be suitable for the polymerization of ethylenically unsaturated monomers. The concentration of the catalyst (initiator) generally will vary within the range of from about 0.2 to about 5 weight percent based on the weight of the monomer mixture. However, any amount sufficient to cause grafting is satisfactory. Illustrative catalysts are the well-known free radical types; for example, hydrogen peroxide, t-butyl peroctoate, lauryl peroxide, cumene hydroperoxide, t-butyl hydroperoxide, benzoyl peroxide, and azobis(isobutyronitrile).

In the practice of the invention, the monomer mixture is employed in an amount within the range of from about 5 to about 45 weight percent, based on the total weight of the monomer mixture and the polyol. Preferably, the monomer mixture will be employed within the range of from about 15 to about 40 weight percent, based on the weight of the monomer mixture and the polyol.

Any conventional process for preparing polymer polyols can be employed to prepare the polymer polyols of this invention. Preferred is a process which maintains high agitation and a low monomer to polyol ratio throughout the reaction mixture during the process. Both batch and continuous processes are suitable The polymerization can also be carried out with an inert organic solvent present. The solvent must be inert, that is, it must not hinder the polymerization reaction. Illustrative solvents are toluene, benzene, acetonitrile, ethyl acetate, hexane, heptane, dicyclohexane, dioxane, acetone, tetrahydrofuran, N,N-dimethylformamide, N,N-dimethylacetamide, and the like, and their mixtures. When an inert organic solvent is used, it is preferably removed by conventional means.

The polyurethane foams of the present invention are generally prepared by the reaction of the graft copolymer dispersion of the invention, with an organic polyisocyanate in the presence of a blowing agent and optionally in the presence of conventionally employed amounts of additional polyhydroxyl-containing components, chain-extending agents, catalysts, surface-active agents, stabilizers, fire retardant compounds, dyes, fillers, and pigments. Suitable processes for the preparation of cellular polyurethane plastics are disclosed in U.S. Pat. No. Re. 24,514, together with suitable machinery to be used in conjunction therewith. When water is added as the blowing agent, corresponding quantities of excess isocyanate to react with the water and produce carbon dioxide may be used. It is also possible to proceed with the preparation of the polyurethanes by a prepolymer technique, wherein an excess of organic polyisocyanate is reacted in a first step with the polyol of the present invention to prepare a prepolymer having free isocyanate groups, which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methoxyphenyl-2,4-diisocyanate, diphenylmethane-4,4'-diisocyanate, 4,4'-biphenylene, 3,3'-dimethyl-4,4'-biphenyl diisocyanate, and 3,3'-dimethyldiphenylmethane-4,4'-biphenyl diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane-2,2'-5,5'-tetraisocyanate. Especially useful due to their availability and properties are toluene diisocyanate, diphenylmethane-4,4'-diisocyanate, and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chainextending agents includes water and primary and secondary diamines which react more readily with the prepolymer than does water such as phenylene diamine, 1,4-cyclohexanebis(methylamine), ethylene diamine, diethylene triamine, N-(2-hydroxypropyl)ethylene diamine, N,N'-di(2-hydroxypropyl)ethylene diamine, piperazine, 2-methylpiperazine, and morpholine.

Any suitable catalyst may be used, including tertiary amines such as, for example, triethylene diamine, N-methyl morpholine, N-ethyl morpholine, diethyl ethanolamine, N-cocomorpholine, 1-methyl-4-dimethylamino ethyl piperazine, 3-methoxy-N-dimethyl propylamine, N-dimethyl-N'-methyl isopropyl propylenediamine, N,N'-diethyl-3-diethyl amino propylamine, dimethyl benzylamine, and the like, and their mixtures. Other suitable catalysts are, for example, tin compounds such as stannous chloride, tin salts of carboxylic acids such as dibutyltin di-2-ethyl hexoate, tin alcoholates such as stannous octoate, as well as other organo metallic compounds such as are disclosed in U.S. Pat. No. 2,846,408.

A surface-active agent is generally necessary for production of high grade polyurethane foam according to the present invention, since in its absence, the foams collapse or contain very large uneven cells. Numerous surfactants have been found satisfactory. Non-ionic surfactants are preferred. Of these, the non-ionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amino or alkylolamine salts of long chain alkyl acid sulfate esters, alkyl sulfonic esters, and alkyl arylsulfonic acids.

It has been observed that polyurethane foam products which have incorporated therein the graft polymer dispersions of the invention require less flame retardant compound to impart flame retardancy. Moreover, equivalent flame retardancy can be achieved using the graft polymer dispersions of the invention and less flame retardant compound as compared to the amount of flame retardant compound needed using graft polymer dispersions of the prior art. Among the flame retardants which may be employed are: pentabromodiphenyl oxide, dibromopropanol, tris($\beta$-chloropropyl)phosphate, 2,2-bis(bromoethyl) 1,3-propanediol, tetrakis(2-chloroethyl)ethylene diphosphate, tris(2,3-dibromopropyl)phosphate, tris($\beta$-chloroethyl)phosphate, tris(1,2-dichloropropyl)phosphate, bis-(2-chloroethyl), 2-chloroethylphosphonate, molybdenum trioxide, ammonium molybdate, ammonium phosphate, pentabromodiphenyloxide, tricresyl phosphate, hexabromocyclododecane, and dibromoethyldibromocyclohexane.

The invention is illustrated by the following examples.

EXAMPLE 1

This example demonstrates the preparation of a styrene/N-phenylmaleimide graft copolymer dispersion of the invention.

Into a 1 liter, 4 neck round-bottom flask equipped with a stirrer, condenser, thermometer, and addition tube, and under a blanket of nitrogen, was charged 319 g of a glycerin started polyether of propylene oxide and ethylene oxide containing about 13% ethylene oxide having a hydroxyl number of 56 and containing essentially secondary OH groups (Polyol A). After heating Polyol A to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 44.9 |
| N—phenylmaleimide | 74.6 |
| Toluene | 50.0 |
| Tetrahydrofuran | 100.0 |
| Azobis(isobutyronitrile) (AIBN) | 2.0 |
| Polyol A | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 2,670 cps (Brookfield cone and plate viscometer spindle #CP-52, 2.5 rpm @ 26° C.) and a solids content by hexane extraction of 26.9%. The resulting styrene/N-phenylmaleimide graft copolymer was diluted to a 20% solids level with Polyol A, and after dilution had a viscosity of 1,380 cps.

EXAMPLE 2

This example demonstrates the preparation of another styrene/N-phenylmaleimide graft copolymer dispersion of the invention.

Into a 1 liter, 4 neck round-bottom flask equipped with a stirrer, condenser, thermometer, and addition tube, and under a blanket of nitrogen, was charged 319 g of a glycerin started polyether of propylene oxide and ethylene oxide with an OH number of 25 and a primary OH group content of about 80%–85% based on the total OH content of the polyether (Polyol B). After heating Polyol B to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 60.0 |
| N—phenylmaleimide | 60.0 |
| Toluene | 50.0 |
| Tetrahydrofuran | 40.0 |
| AIBN | 3.0 |
| Polyol B | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 17,900 cps (Brookfield cone and plate viscometer spindle #CP-52, 2.5 rpm @ 26° C.).

EXAMPLE 3

This example demonstrates the preparation of another styrene/N-phenylmaleimide graft copolymer dispersion of the invention.

Into a 1 liter, 4 neck round-bottom flask equipped with a stirrer, condenser, thermometer, and addition tube, and under a blanket of nitrogen, was charged 638 g of Polyol B. After heating Polyol B to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 53.2 |
| N—phenylmaleimide | 53.0 |
| Toluene | 100.0 |
| Tetrahydrofuran | 20.0 |
| AIBN | 3.0 |
| Polyol B | 638.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 3,150 cps (Brookfield cone and plate viscometer spindle #CP-52, 2.5 rpm @ 26° C.).

EXAMPLE 4

This example demonstrates the preparation of another styrene/N-phenylmaleimide graft copolymer dispersion of the invention.

Into a 1 liter, 4 neck round-bottom flask equipped with a stirrer, condenser, thermometer, and addition tube, and under a blanket of nitrogen, was charged 319 g of a glycerin started polyether of propylene oxide and ethylene oxide having an hydroxyl number of 35 and a primary OH group content of about 75%–80% based on the total OH content of the polyether (Polyol C). After heating Polyol C to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 26.6 |
| N—phenylmaleimide | 26.5 |
| Toluene | 50.0 |
| Tetrahydrofuran | 10.0 |
| AIBN | 1.5 |
| Polyol C | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 1,570 cps (Brookfield cone and plate viscometer spindle #CP-52, 2.5 rpm @ 26° C.).

EXAMPLE 5

This example demonstrates the preparation of another styrene/N-phenylmaleimide graft copolymer dispersion of the invention.

Into a 1 liter, 4 neck round-bottom flask equipped with a stirrer, condenser, thermometer, and addition tube, and under a blanket of nitrogen, was charged 319 g of Polyol C. After heating Polyol C to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 60.6 |
| N—phenylmaleimide | 60.5 |
| Toluene | 50.0 |
| Tetrahydrofuran | 50.0 |
| AIBN | 3.0 |
| Polyol C | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 3,930 cps (Brookfield cone and plate viscometer spindle #CP-52, 2.5 rpm @ 26° C.).

EXAMPLE 6

This example demonstrates the preparation of a graft copolymer dispersion of the invention using both N-phenylmaleimide and N-(2,4,6-tribromophenyl)maleimide monomers.

Into a 1 liter, 4 neck round-bottom flask equipped with a stirrer, condenser, thermometer, and addition tube, and under a blanket of nitrogen, was charged 319 g of Polyol A. After heating Polyol A to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 53.7 |
| N—phenylmaleimide | 44.7 |
| Tribromophenylmaleimide | 21.1 |
| Toluene | 50.0 |
| Tetrahydrofuran | 20.0 |
| AIBN | 3.0 |
| Polyol A | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 3,930 cps (Brookfield cone and plate viscometer spindle #CP-52, 2.5 rpm @26° C.) and a solids content by hexane extraction of 22.2%.

EXAMPLE 7

This example demonstrates the preparation of a styrene/maleimide/acrylonitrile graft terpolymer dispersion of the invention.

Into a 1 liter, 4 neck round-bottom flask equipped with a stirrer, condenser, thermometer, and addition tube, and under a blanket of nitrogen, was charged 534 g of Polyol A. After heating Polyol A to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 94.0 |
| Maleimide | 26.0 |
| Acrylonitrile | 80.0 |
| Toluene | 50.0 |
| AIBN | 5.0 |
| Polyol A | 266.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 22,000 cps (Brookfield cone and plate viscometer spindle #CP-52, 2.5 rpm @ 26° C.) and a solids content by hexane extraction of 24.0%.

EXAMPLE 8

This example demonstrates the preparation of a styrene/N-phenylmaleimide/acrylonitrile graft terpolymer dispersion of the invention.

Into a 1 liter, 4 neck round-bottom flask equipped with a stirrer, condenser, thermometer, and addition tube, and under a blanket of nitrogen, was charged 1,072 g of Polyol A. After heating Polyol A to 110° C. and maintaining that temperature for about 30 minutes, the following monomer charge was added over a 2-hour period to give a milk-white dispersion.

| Monomer Charge | |
| --- | --- |
| Ingredient | Amount (g) |
| Styrene | 200.0 |
| N—phenylmaleimide | 40.0 |
| Acrylonitrile | 160.0 |
| Toluene | 40.7 |
| AIBN | 10.0 |
| Polyol A | 530.0 |

Upon completion of the addition, the dispersion was held at 110° C. for 30 minutes, then the reaction mixture was stripped for 2.5 hours at 90° C. and 1 mm Hg and passed through a wiped film evaporator at 150° C. and 5 torr. to yield a stable polymer polyol dispersion. The polymer polyol dispersion was found to have a viscosity of 3,110 cps (Brookfield cone and plate viscometer spindle #CP-52, 5.0 rpm @ 26° C.) and a solids content by hexane extraction of 22.5%. The resulting styrene/N-phenylmaleimide/acrylonitrile terpolymer dispersion was diluted to a 20% solids level with Polyol A, and after dilution had a viscosity of 2,100 cps.

EXAMPLE 9

This example demonstrates the preparation of another styrene/N-phenylmaleimide/acrylonitrile graft terpolymer dispersion of the invention.

Into a 1 liter, 4 neck round-bottom flask equipped with a stirrer, condenser, thermometer, and addition tube, and under a blanket of nitrogen, was charged 1,070 g of Polyol A. After heating Polyol A to 110° C. and maintaining that temperature for about 30 minutes, the following monomer charge was added over a 2-hour period to give a milk-white dispersion.

| Monomer Charge | |
| --- | --- |
| Ingredient | Amount (g) |
| Styrene | 200.0 |
| N—phenylmaleimide | 80.0 |
| Acrylonitrile | 120.0 |
| Toluene | 80.0 |
| AIBN | 10.0 |
| Polyol A | 530.0 |

Upon completion of the addition, the dispersion was held at 110° C. for 30 minutes, then the reaction mixture was stripped for 2.5 hours at 90° C. and 1 mm Hg and passed through a wipe film evaporator to yield a stable polymer polyol dispersion. The polymer polyol dispersion was found to have a viscosity of 4,030 cps (Brookfield cone and plate viscometer spindle #CP-52, 5.0 rpm @ 26° C.) and a solids content by hexane extraction of 23.3%. The resulting styrene/N-phenylmaleimide/acrylonitrile terpolymer dispersion was recovered and diluted to a 20% solids level with Polyol A.

EXAMPLE 10

This example demonstrates the preparation of a styrene/N-phenylmaleimide/maleic anhydride graft terpolymer dispersion of the invention.

Into a 1 liter, 4 neck round-bottom flask equipped with a stirrer, condenser, thermometer, and addition tube, and under a blanket of nitrogen, was charged 319 g of Polyol A. After heating Polyol A to 110° C. and maintaining that temperature for about 30 minutes, the following monomer charge was added over a 2-hour period to give a milk-white dispersion.

| Monomer Charge | |
| --- | --- |
| Ingredient | Amount (g) |
| Styrene | 50.3 |
| N—phenylmaleimide | 50.2 |
| Maleic Anhydride | 19.0 |
| Toluene | 50.0 |
| AIBN | 3.0 |
| Polyol A | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 2,750 cps (Brookfield cone and plate viscometer spindle #CP-52, 2.5 rpm @ 26° C.) and a solids content by hexane extraction of 27.5%. The resulting styrene/N-phenylmaleimide/maleic anhydride terpolymer dispersion was diluted to a 20% solids level with Polyol A, and after dilution had a viscosity of 1,220 cps.

EXAMPLE 11

This example demonstrates the preparation of a styrene/tribromophenylmaleimide/maleic anhydride graft terpolymer dispersion of the invention.

Into a 1 liter, 4 neck round-bottom flask equipped with a stirrer, condenser, thermometer, and addition tube, and under a blanket of nitrogen, was charged 319 g of Polyol A. After heating Polyol A to 110° C. and maintaining that temperature for about 30 minutes, the following monomer charge was added over a 2-hour period to give a milk-white dispersion.

| Monomer Charge | |
| --- | --- |
| Ingredient | Amount (g) |
| Styrene | 56.3 |
| Tribromophenylmaleimide | 13.3 |
| Maleic Anhydride | 49.9 |
| Toluene | 50.0 |
| AIBN | 3.0 |
| Polyol A | 159.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 3,850 cps (Brookfield cone and plate viscometer spindle #CP-52,2.5 rpm @ 26° C.) and a solids content by hexane extraction of 26.8%. The resulting styrene/tribromophenylmaleimide/maleic anhydride terpolymer dispersion was diluted to a 20% solids level with Polyol A, and after dilution had a viscosity of 1,570 cps.

EXAMPLE 12

This example demonstrates the preparation of a styrene/N-phenylmaleimide/vinyl acetate graft terpolymer dispersion of the invention.

Into a 1 liter, 4 neck round-bottom flask equipped with a stirrer, condenser, thermometer, and addition tube, and under a blanket of nitrogen, was charged 638 g of Polyol A. After heating Polyol A. to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 106.5 |
| N—phenylmaleimide | 88.5 |
| Vinyl acetate | 44.0 |
| Toluene | 100.0 |
| AIBN | 4.0 |
| Polyol A | 318.0 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 1,730 cps (Brookfield cone and plate viscometer spindle #CP-52, 2.5 rpm @ 26° C.) and a solids content by hexane extraction of 18.2%.

COMPARATIVE EXAMPLE

This example demonstrates the preparation of a styrene/acrylonitrile graft copolymer dispersion for flame retardancy comparison tests with the maleimide copolymer dispersions according to this invention.

Into a 1 liter, 4 neck round-bottom flask equipped with a stirrer, condenser, thermometer, and addition tube, and under a blanket of nitrogen, was charged 373 g of a glycerin, propylene oxide, ethylene oxide adduct containing about 13% ethylene oxide and having a hydroxyl number of 56. After heating Polyol A to 110° C. and maintaining that temperature for about 30 minutes, the following monomer charge was added over a 2-hour period to give a milk-white dispersion.

| Monomer Charge | |
|---|---|
| Ingredient | Amount (g) |
| Styrene | 122.3 |
| Acrylonitrile | 120.0 |
| AIBN | 6.1 |
| Polyol A | 187.5 |

Upon completion of the addition, the dispersion was held at 110° C. for 30 minutes, then the reaction mixture was stripped for 2.5 hours at 90° C. and 1 mm Hg to yield a stable polymer polyol dispersion. The polymer polyol dispersion was found to have a viscosity of 5,780 cps (Brookfield cone and plate viscometer spindle #CP-52, 2.5 rpm @ 26° C.) and a solids content by hexane extraction of 32.2%. The resulting styrene/acrylonitrile copolymer dispersion was recovered and diluted to 20% solids with Polyol A.

The following data present a flame retardancy comparison between a styrene/N-phenylmaleimide graft copolymer dispersion of the subject invention (Example 1) and the prior art (Comparative Example). The prior art copolymer dispersion is a styrene/acrylonitrile dispersion prepared according to the procedure of the preceding Comparative Example.

The dispersion of the prior art employs a styrene/acrylonitrile copolymer. In contrast, the dispersion of the present invention contains a styrene/N-phenylmaleimide copolymer and contains no acrylonitrile. The polyurethane foams were separately prepared by charging the amounts of polyol, water catalysts, silicone surfactant, and flame retardant compound indicated into a one-liter cylindrical container equipped with a mechanical stirrer. The mixture was stirred for about 30 seconds at 5,000 to 6,000 rpm and the indicated amount of polyisocyanate was introduced into the container with stirring for about 10 seconds. The content of the container was then immediately poured into a cardboard cake box and the foam was allowed to rise. After the foam rise was completed, the foam was allowed to cure at room temperature for about one week.

The flame retardancy test data were determined according to the State of California, Department of Consumer Affairs, Bureau of Home Furnishings, North Highlands, Calif., Technical Bulletin 117 (January, 1980), Section A, Part I, "Resilient Cellular Materials" (hereinafter referred to as "California No. 117, A.I.").

| | Polyol of | | |
|---|---|---|---|
| | Comparative Example | Example 1 | |
| | Prior Art | Invention | Invention |
| Formulation, pbw | | | |
| Polyol (20% wt. solids) | 100 | 100 | 100 |
| Thermolin 101[1] | 9.0 | 9.0 | 5.0 |
| Water | 4.0 | 4.0 | 4.0 |
| L-5810[2] surfactant | 0.75 | 0.75 | 0.75 |
| NIAX A-1[3] catalyst | 0.15 | 0.15 | 0.15 |
| T-9[4] catalyst | 0.11 | 0.11 | 0.11 |
| Methylene chloride | 2.0 | 2.0 | 2.0 |
| Toluene diisocyanate | 50 | 50 | 50 |
| Flame Retardancy[5] | | | |
| Average char length (in) | 6.3 | 3.8 | 5.0 |
| Average after flame (sec) | 9.2 | 2.0 | 1.6 |

[1]tetrakis(2-chloroethyl)ethylene diphosphate, Olin Corp.
[2]silicon surfactant, Union Carbide Corporation
[3]amine catalyst, Union Carbide Corporation
[4]organo tin catalyst, Air Products and Chemicals, Inc.
[5]California 117 A.I., non-aged foam samples It will be seen from the above that the absence of acrylonitrile and the presence of N-phenylmaleimide in the copolymer dispersion of the invention results in foams which exhibit flame retardancy superior to that of the prior art.

Examples 13–19 are shown in following Table I which sets forth the ingredients and amounts thereof used to prepare additional foams of the invention following substantially the foam preparation procedure described above.

TABLE I

POLYURETHANE FOAM FORMATION AND FIRE RETARDANCY DATA

| | Example No. | | | | | | |
|---|---|---|---|---|---|---|---|
| | 13 | 14 | 15 | 16 | 17 | 18 | 19 |
| | Polyol of Example No. | | | | | | |
| | 8 | 8 | 8 | 8 | 9 | 9 | 9 |
| Ingredients pbw | | | | | | | |
| Polyol | 100 | 100 | 100 | 100 | 100 | 100 | 100 |
| Thermolin[1] 101 | 7.0 | 8.0 | 9.0 | 12.0 | 7.0 | 8.0 | 12.0 |
| Water | 4.0 | 4.0 | 4.0 | 4.0 | 4.0 | 4.0 | 4.0 |
| L-5810[2] Surfactant | 0.75 | 0.75 | 0.75 | 0.75 | 0.75 | 0.75 | 0.75 |
| NIAX A-1[3] Catalyst | 0.15 | 0.15 | 0.15 | 0.15 | 0.15 | 0.15 | 0.15 |
| T-9[4] Catalyst | 0.1 | 0.1 | 0.1 | 0.1 | 0.1 | 0.1 | 0.1 |
| Methylene Chloride | 2.0 | 2.0 | 2.0 | 2.0 | 2.0 | 2.0 | 2.0 |
| Toluene Diisocyanate | 50 | 50 | 50 | 50 | 50 | 50 | 50 |
| Flame Retardancy[5] | | | | | | | |
| Char length Ave. (in.) | 4.6 | 4.8 | 5.1 | 3.5 | 1.8 | 2.5 | 2.3 |
| Afterflame Ave. (sec.) | 9 | 16 | 8.4 | 1.8 | 4.5 | 2.8 | 2.3 |

[1]tetrakis(2-chloroethyl)ethylene diphosphate, Olin Corp.
[2]silicon surfactant, Union Carbide Corporation
[3]amine catalyst, Union Carbide Corporation
[4]organo tin catalyst, Air Products and Chemicals, Inc.
[5]California 117 A.I., non-aged foam samples It will be evident from the foregoing that various modifications can be made to this invention. Such, however, are considered as being within the scope of the invention.

What is claimed is:

1. A stable polymer polyol suitable for reaction with an isocyanate to form a polyurethane prepared by reacting at a temperature within the range of from about 70° C. to about 150° C. under free radical conditions a minor amount of a monomer mixture and a major amount of an organic polyol medium wherein:
   (a) the monomer mixture comprises at least a first and a second monomer, wherein said first monomer is a maleimide monomer selected from the group consisting of N-arylmaleimides and N-alkylmaleimides and said second monomer is a styrenic monomer which is polymerizable with said first monomer; and
   (b) the organic polyol medium consists essentially of a polyoxyalkylene polyether polyol having a molecular weight within the range of from about 2000 to about 6500 prepared from a polyhydric alcohol and at least one alkene oxide.

2. The polymer polyol of claim 1 in which said first monomer is selected from the group consisting of at least one maleimide, N-aryl maleimides, and N-alkyl maleimides.

3. The polymer polyol of claim 1 in which said first monomer is N-phenylmaleimide.

4. The polymer polyol of claim 1 in which said second monomer is selected from the group consisting of at least one of styrene, α-methylstyrene, and p-methylstyrene.

5. The polymer polyol of claim 1 in which said second monomer is styrene.

6. The polymer polyol of claim 1 in which said first monomer is N-phenylmaleimide and said second monomer is styrene.

7. The polymer polyol of claim 1 in which said monomer mixture comprises at least a first, a second, and a third monomer, wherein said third monomer is copolymerizable with said first and said second monomers.

8. The polymer polyol of claim 1 in which said monomer mixture is employed in an amount of from about 5 to about 45 weight percent based on the total weight of the monomer mixture and the organic polyol.

9. The polymer polyol of claim 1 in which said monomer mixture is employed in an amount of from about 15 to about 40 weight percent based on the total weight of the monomer mixture and organic polyol.

10. The polymer polyol of claim 1 in which at least a portion of the polyoxyalkylene polyol contains small amounts of unsaturation.

* * * * *